United States Patent
Lavoie

(10) Patent No.: US 9,963,004 B2
(45) Date of Patent: May 8, 2018

(54) TRAILER SWAY WARNING SYSTEM AND METHOD

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 14/668,343

(22) Filed: Mar. 25, 2015

(65) Prior Publication Data

US 2016/0023525 A1    Jan. 28, 2016

Related U.S. Application Data

(60) Provisional application No. 62/029,911, filed on Jul. 28, 2014.

(51) Int. Cl.
| | | |
|---|---|---|
| G08B 21/00 | (2006.01) | |
| B60D 1/30 | (2006.01) | |
| B60T 8/1755 | (2006.01) | |
| B60D 1/06 | (2006.01) | |
| B60D 1/62 | (2006.01) | |
| B60T 8/17 | (2006.01) | |

(52) U.S. Cl.
CPC .............. *B60D 1/305* (2013.01); *B60D 1/06* (2013.01); *B60D 1/30* (2013.01); *B60D 1/62* (2013.01); *B60T 8/1708* (2013.01); *B60T 8/1755* (2013.01); *B60T 2230/06* (2013.01)

(58) Field of Classification Search
CPC . B60D 1/305; B60D 1/30; B60D 1/62; B60D 1/06; B60Q 1/305; B60T 8/1755; B60T 8/1708; B60T 2230/06
USPC ...... 340/431, 442; 701/70, 2, 25, 36, 41, 42, 701/49; 348/118
See application file for complete search history.

(56) References Cited

U.S. PATENT DOCUMENTS

| | | |
|---|---|---|
| 3,542,390 A | 11/1970 | Fikes et al. |
| 3,605,088 A | 9/1971 | Savelli |

(Continued)

FOREIGN PATENT DOCUMENTS

| | | |
|---|---|---|
| CN | 102582686 B | 9/2013 |
| DE | 3923676 A1 | 1/1991 |

(Continued)

OTHER PUBLICATIONS

Delphi Corporation "Delphi Lane Departure Warning"; Dec. 17, 2013; 2 pages.

(Continued)

*Primary Examiner* — Dhaval Patel
(74) *Attorney, Agent, or Firm* — Raymond Coppiellie; Price Heneveld LLP

(57) ABSTRACT

A trailer sway warning system, according to one embodiment, includes a hitch angle sensor for sensing a hitch angle between a vehicle and a trailer. The trailer sway warning system includes a vehicle sensor for sensing a dynamic parameter of the vehicle, such as a steering angle rate or a yaw rate of the vehicle. Further, the trailer sway warning system includes a controller that generates a warning signal when the hitch angle is oscillating at a magnitude that exceeds a warning threshold and the dynamic parameter is substantially constant.

18 Claims, 9 Drawing Sheets

(56) References Cited

U.S. PATENT DOCUMENTS

| | | |
|---|---|---|
| 3,787,077 A | 1/1974 | Sanders |
| 3,833,928 A | 9/1974 | Gavit et al. |
| 3,860,257 A | 1/1975 | Mesley |
| 3,948,567 A | 4/1976 | Kasselmann et al. |
| 4,040,006 A | 8/1977 | Kimmel |
| 4,042,132 A | 8/1977 | Bohman et al. |
| 4,122,390 A | 10/1978 | Kollitz et al. |
| 4,196,936 A | 4/1980 | Snyder |
| 4,212,483 A | 7/1980 | Howard |
| 4,366,966 A | 1/1983 | Ratsko et al. |
| 4,735,432 A | 4/1988 | Brown |
| 4,752,080 A | 6/1988 | Rogers |
| 4,848,449 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,124,709 A | 9/2000 | Allwine |
| 6,151,175 A | 11/2000 | Osha |
| 6,198,386 B1 | 3/2001 | White, II |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,268,800 B1 | 7/2001 | Howard |
| 6,292,094 B1 | 9/2001 | Deng et al. |
| 6,351,698 B1 | 2/2002 | Kubota et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,655,710 B2 | 12/2003 | Lindell et al. |
| 6,668,225 B2 | 12/2003 | Oh et al. |
| 6,704,653 B2 | 3/2004 | Kuriya et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,089,101 B2 | 8/2006 | Fischer et al. |
| 7,154,385 B2 | 12/2006 | Lee et al. |
| 7,159,890 B2 | 1/2007 | Craig et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,367,407 B2 | 5/2008 | Lannert |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,561,032 B2 | 7/2009 | Huang et al. |
| 7,566,851 B2 | 7/2009 | Stein et al. |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,693,661 B2 | 4/2010 | Iwasaka |
| 7,715,953 B2 | 5/2010 | Shepard |
| 7,731,302 B2 | 6/2010 | Tandy, Jr. et al. |
| 7,737,832 B2 | 6/2010 | Baratoff et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,905,555 B2 | 3/2011 | Huntimer |
| 7,950,751 B2 | 5/2011 | Offerle et al. |
| 7,953,536 B2 | 5/2011 | Katrak |
| 7,974,444 B2 | 7/2011 | Hongo |
| 8,010,252 B2 | 8/2011 | Getman et al. |
| 8,010,253 B2 | 8/2011 | Lundquist |
| 8,036,792 B2 | 10/2011 | Dechamp |
| 8,038,166 B1 | 10/2011 | Piesinger |
| 8,044,779 B2 | 10/2011 | Hahn et al. |
| 8,073,594 B2 | 12/2011 | Lee et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,180,543 B2 | 5/2012 | Futamura et al. |
| 8,190,364 B2 | 5/2012 | Rekow |
| 8,191,915 B2 | 6/2012 | Freese, V et al. |
| 8,192,036 B2 | 6/2012 | Lee et al. |
| 8,215,436 B2 | 7/2012 | DeGrave et al. |
| 8,223,204 B2 | 7/2012 | Hahn |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,308,182 B2 | 11/2012 | Ortmann et al. |
| 8,326,504 B2 | 12/2012 | Wu et al. |
| 8,342,560 B2 | 1/2013 | Albers et al. |

(56) References Cited

U.S. PATENT DOCUMENTS

| | | |
|---|---|---|
| 8,350,684 B2 | 1/2013 | McClure |
| 8,380,390 B2 | 2/2013 | Sy et al. |
| 8,380,416 B2 | 2/2013 | Offerle et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,428,821 B2 | 4/2013 | Nilsson |
| 8,469,125 B2 | 6/2013 | Yu et al. |
| 8,504,243 B2 | 8/2013 | Kageyama |
| 8,548,680 B2 | 10/2013 | Ryerson et al. |
| 8,548,683 B2 | 10/2013 | Cebon et al. |
| 8,576,115 B2 | 11/2013 | Basten |
| 8,626,382 B2 | 1/2014 | Obradovich |
| 8,675,953 B1 | 3/2014 | Elwell et al. |
| 8,755,984 B2 | 6/2014 | Rupp et al. |
| 8,807,261 B2 | 8/2014 | Subrt et al. |
| 8,825,328 B2 | 9/2014 | Rupp et al. |
| 8,833,789 B2 | 9/2014 | Anderson |
| 8,886,400 B2 | 11/2014 | Kossira et al. |
| 8,888,120 B2 | 11/2014 | Trevino |
| 8,895,865 B2 | 11/2014 | Lenahan et al. |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 | 9/2015 | Chiu et al. |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,227,474 B2 | 1/2016 | Liu |
| 9,238,483 B2 | 1/2016 | Hafner et al. |
| 9,248,858 B2 | 2/2016 | Lavoie et al. |
| 9,296,422 B2 | 3/2016 | Lavoie |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,393,996 B2 | 7/2016 | Goswami et al. |
| 9,434,414 B2 | 9/2016 | Lavoie |
| 9,500,497 B2 | 11/2016 | Lavoie |
| 9,616,923 B2 | 4/2017 | Lavoie |
| 9,623,904 B2 | 4/2017 | Lavoie et al. |
| 9,676,377 B2 | 6/2017 | Hafner et al. |
| 2001/0024333 A1 | 9/2001 | Rost |
| 2001/0037164 A1 | 11/2001 | Hecker |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0222881 A1 | 11/2004 | Deng et al. |
| 2005/0000738 A1 | 1/2005 | Gehring et al. |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2005/0242931 A1 | 11/2005 | Gunderson et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0179697 A1 | 8/2007 | Holler |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0186204 A1 | 8/2008 | Buckley |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0300701 A1 | 12/2009 | Karaoguz et al. |
| 2009/0306861 A1 | 12/2009 | Schumann et al. |
| 2010/0039722 A1 | 2/2010 | Lee et al. |
| 2010/0063702 A1 | 3/2010 | Sabelstrom et al. |
| 2010/0171828 A1 | 7/2010 | Ishii |
| 2010/0191421 A1 | 7/2010 | Nilsson |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0140872 A1 | 6/2011 | McClure |
| 2011/0160956 A1 | 6/2011 | Chung et al. |
| 2011/0257860 A1 | 10/2011 | Getman et al. |
| 2012/0004805 A1 | 1/2012 | Gray et al. |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088824 A1 | 3/2014 | Ishimoto |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0200759 A1* | 7/2014 | Lu .................... B60D 1/245 701/28 |

(56) References Cited

U.S. PATENT DOCUMENTS

| | | | |
|---|---|---|---|
| 2014/0210456 A1 | 7/2014 | Crossman | |
| 2014/0218506 A1 | 8/2014 | Trombley et al. | |
| 2014/0218522 A1 | 8/2014 | Lavoie et al. | |
| 2014/0222288 A1 | 8/2014 | Lavoie et al. | |
| 2014/0236532 A1 | 8/2014 | Trombley et al. | |
| 2014/0249691 A1 | 9/2014 | Hafner et al. | |
| 2014/0267688 A1 | 9/2014 | Aich et al. | |
| 2014/0267689 A1 | 9/2014 | Lavoie | |
| 2014/0277941 A1 | 9/2014 | Chiu et al. | |
| 2014/0277942 A1 | 9/2014 | Kyrtsos et al. | |
| 2014/0297128 A1 | 10/2014 | Lavoie et al. | |
| 2014/0297129 A1 | 10/2014 | Lavoie et al. | |
| 2014/0303847 A1 | 10/2014 | Lavoie | |
| 2014/0309888 A1 | 10/2014 | Smit et al. | |
| 2014/0324295 A1 | 10/2014 | Lavoie | |
| 2014/0343795 A1 | 11/2014 | Lavoie | |
| 2014/0358429 A1 | 12/2014 | Shutko et al. | |
| 2014/0379217 A1 | 12/2014 | Rupp et al. | |
| 2015/0002670 A1 | 1/2015 | Bajpai | |
| 2015/0035256 A1 | 2/2015 | Klank et al. | |
| 2015/0057903 A1 | 2/2015 | Rhode et al. | |
| 2015/0066296 A1 | 3/2015 | Trombley et al. | |
| 2015/0066298 A1 | 3/2015 | Sharma et al. | |
| 2015/0105975 A1 | 4/2015 | Dunn | |
| 2015/0115571 A1 | 4/2015 | Zhang et al. | |
| 2015/0120141 A1 | 4/2015 | Lavoie et al. | |
| 2015/0120143 A1 | 4/2015 | Schlichting | |
| 2015/0134183 A1 | 5/2015 | Lavoie et al. | |
| 2015/0138340 A1 | 5/2015 | Lavoie | |
| 2015/0149040 A1 | 5/2015 | Hueger et al. | |
| 2015/0158527 A1 | 6/2015 | Hafner et al. | |
| 2015/0165850 A1* | 6/2015 | Chiu | B60D 1/30 701/41 |
| 2015/0197278 A1 | 7/2015 | Boos et al. | |
| 2015/0203156 A1 | 7/2015 | Hafner et al. | |
| 2015/0210254 A1 | 7/2015 | Pieronek et al. | |
| 2015/0210317 A1 | 7/2015 | Hafner et al. | |
| 2015/0217693 A1 | 8/2015 | Pliefke et al. | |
| 2015/0269444 A1 | 9/2015 | Lameyre et al. | |
| 2016/0001705 A1 | 1/2016 | Greenwood et al. | |
| 2016/0009288 A1 | 1/2016 | Yu | |
| 2016/0039456 A1 | 2/2016 | Lavoie et al. | |
| 2016/0059780 A1 | 3/2016 | Lavoie | |
| 2016/0059888 A1 | 3/2016 | Bradley et al. | |
| 2016/0059889 A1 | 3/2016 | Herzog et al. | |
| 2016/0096549 A1 | 4/2016 | Herzog et al. | |
| 2016/0129939 A1 | 5/2016 | Singh et al. | |
| 2016/0152263 A1 | 6/2016 | Singh et al. | |
| 2016/0153778 A1 | 6/2016 | Singh et al. | |
| 2016/0229452 A1 | 8/2016 | Lavoie et al. | |
| 2016/0280267 A1 | 9/2016 | Lavoie et al. | |
| 2017/0073005 A1 | 3/2017 | Ghneim et al. | |

FOREIGN PATENT DOCUMENTS

| | | |
|---|---|---|
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006013817 A1 | 9/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 102012005707 A1 | 10/2012 |
| DE | 202010018552 U1 | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0418653 A1 | 3/1991 |
| EP | 0433858 A2 | 6/1991 |
| EP | 1361543 A2 | 11/2003 |
| EP | 1593552 B1 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A1 | 2/2008 |
| JP | 2012105158 A | 5/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |

(56) References Cited

FOREIGN PATENT DOCUMENTS

| | | |
|---|---|---|
| WO | 2015074027 A1 | 5/2015 |
| WO | 2015187467 A1 | 12/2015 |

OTHER PUBLICATIONS

Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.
"Ford Super Duty: Truck Technologies", Brochure, Sep. 2011, 2 pages.
Kristopher Bunker, "2012 Guide to Towing", Trailer Life, 2012, 38 pages.
A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.
L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.
M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.
F.W. Kienhofer; D. Cebon, "An Investigation of ABS Strategies for Articulated Vehicles", Cambridge University, Engineering Department, United Kingdom, date unknown, 13 pages.
C. Lundquist; W. Reinelt; O. Enqvist, "Back Driving Assistant for Passenger Cars with Trailer", ZF Lenksysteme GmbH, Schwabisch Gmünd, Germany, 2006 (SAE Int'l) Jan. 2006, 8 pages.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.
Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 6 pages.
A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.
Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, date unknown, 6 pages.
Jane McGrath, "How to Avoid Jackknifing", A Discovery Company, date unknown, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, SAGE Journals, vol. 225, No. 7, Jul. 2011, 1 page.
Haviland, G S, "Automatic Brake Control for Trucks—What Good Is It?", TRID, Society of Automotive Engineers, Sep. 1968, 1 page.
William E. Travis; David W. Hodo; David M. Bevly; John Y. Hung, "UGV Trailer Position Estimation Using a Dynamic Base RTK System", American Institute of Aeronautics and Astronautics, date unknown, 12 pages.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
"Fully Automatic Trailer Tow Hitch With LIN Bus," https://webista.bmw.com/webista/show?id=1860575499&lang=engb&print=1, date unknown, 5 pages.
"VBOX Yaw Rate Sensor With Integral Accelerometers," Racelogic, www.racelogic.co.uk, date unknown, 2 pages.
P.D.C.R Jayarathna; J.V Wijayakulasooriya; S.R Kodituwakku, "Fuzzy Logic and Neural Network Control Systems for Backing up

(56) References Cited

OTHER PUBLICATIONS a Truck and a Trailer", International Journal of Latest Trends in Computing, vol. 2, No. 3, Sep. 2011, 8 pages.

Olof Enqvist, "AFS-Assisted Trailer Reversing," Institutionen för systemteknik Deartment of Electrical Engineering, Jan. 27, 2006, 57 pages.

Sh. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

\* cited by examiner

TRAILER SWAY WARNING SYSTEM AND METHOD

CROSS-REFERENCE TO RELATED APPLICATION

This application claims benefit to U.S. Provisional Patent Application No. 62/029,911, entitled "TRAILER SWAY WARNING SYSTEM AND METHOD," filed on Jul. 28, 2014, the entire disclosure of which is hereby incorporated herein by reference

FIELD OF THE INVENTION

The disclosure made herein relates generally to active safety technologies in vehicles, and more particularly to a trailer sway warning system that is configured with a hitch angle sensor.

BACKGROUND OF THE INVENTION

It is generally understood that a trailer may sway when the towing vehicle is driving forward. This can occur for several reasons, including the trailer experiencing a lateral force, such as wind, the weight distribution on the trailer or the hitch connection being unbalanced, the trailer tires being in a degraded condition, and the vehicle exceeding a certain speed. These reasons for trailer sway may be exaggerated with certain kinematic factors, such as the length of the trailer being disproportionate with the wheel base of the vehicle. Accordingly, it is desired for the driver to be aware of swaying movement of the trailer, as such swaying movement may cause the trailer to travel outside an intended path and may also cause vehicle instability.

SUMMARY OF THE INVENTION

According to one aspect of the present invention, a trailer sway warning system includes a hitch angle sensor for sensing a hitch angle between a vehicle and a trailer. The trailer sway warning system also includes a vehicle sensor for sensing a dynamic parameter of the vehicle. Further, the trailer sway warning system includes a controller that generates a warning signal when the dynamic parameter is substantially constant and the hitch angle is oscillating at a magnitude that exceeds a warning threshold.

According to another aspect of the present invention, a trailer sway warning system includes a hitch angle sensor that senses a hitch angle between a vehicle and a trailer. The trailer sway warning system also includes a controller that has an oscillation module and a warning module. The oscillation module determines a magnitude of oscillation of the hitch angle about a central angle. The warning module generates a warning signal when the magnitude exceeds a warning threshold and the central angle is substantially constant.

According to yet another aspect of the present invention, a method for providing a trailer sway warning includes sensing a hitch angle between a vehicle and a trailer. The method also includes sensing a dynamic parameter of the vehicle. Further, the method includes generating a warning signal based on the dynamic parameter being substantially constant and the hitch angle oscillating at a magnitude that exceeds a warning threshold.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
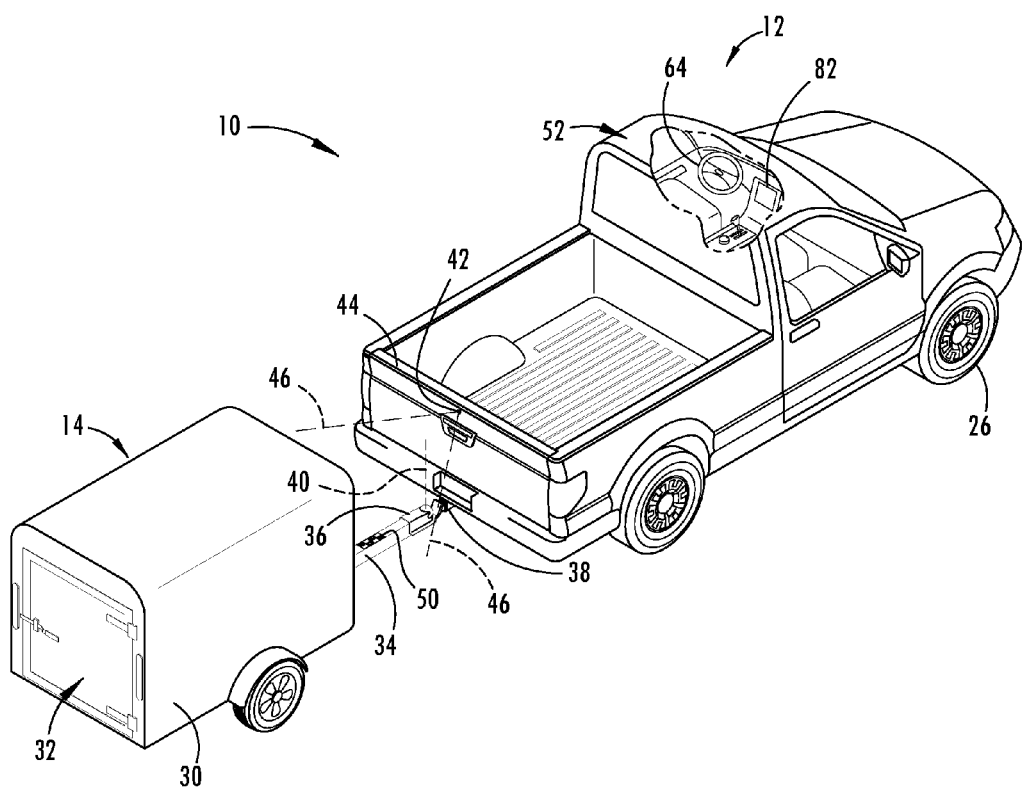
FIG. 1 is a top perspective view of a vehicle attached to a trailer with one embodiment of a hitch angle sensor.

For purposes of description herein, it is to be understood that the disclosed trailer sway warning system and the related methods may assume various alternative embodiments and orientations, except where expressly specified to the contrary. It is also to be understood that the specific devices and processes illustrated in the attached drawings, and described in the following specification are simply exemplary embodiments of the inventive concepts defined in the appended claims. While various aspects of the trailer sway warning system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-10, reference numeral 10 generally designates a trailer sway warning system for a vehicle 12 towing a trailer 14 by monitoring a hitch angle γ between the vehicle 12 and the trailer 14. To monitor the position of the trailer 14 relative to the vehicle 12, the trailer sway warning system 10 may include a sensor system 16 that senses the hitch angle γ between the trailer 14 and the vehicle 12, which may be generally referred to as a hitch angle sensor 18. To avoid unacceptable trailer conditions, such as swaying at a frequency greater than an allowable threshold, the hitch angle γ and related information from the hitch angle sensor 18 may be monitored and processed with a warning routine 20 to provide a hitch angle warning signal to the driver. The trailer sway warning system 10, according to one embodiment, also provides a steering angle sensor 24 that senses a steering angle rate of steered wheels 26 of the vehicle 12. The trailer sway warning system 10 may generate a warning signal when the steering angle rate is substantially zero and the hitch angle γ is not substantially constant, or otherwise oscillating, which is indicative of trailer sway. An additional embodiment of the trailer sway warning system 10 may include a yaw rate sensor 58 for sensing a yaw rate of the vehicle 12, whereby a warning signal may be generated when the yaw rate is substantially constant and the hitch angle γ is oscillating at a magnitude that exceeds a warning threshold. Further, alternative embodiments of the trailer sway warning system 10 may determine a central angle, about which the hitch angle γ is oscillating. In such an embodiment, a warning signal may be generated when the central angle is substantially constant and the magnitude of oscillation is exceeding a warning threshold 28. Accordingly, in one embodiment, a warning signal indicative of trailer sway may be generated based on the hitch angle γ and a dynamic parameter of the vehicle, such as the steering angle or the yaw rate, sensed by a vehicle sensor, such as the steering angle sensor 24 or the yaw rate sensor 58.

With reference to the embodiment shown in FIG. 1, the vehicle 12 is a pickup truck embodiment that is equipped with one embodiment of the trailer sway warning system 10 for monitoring the trailer 14 that is attached to the vehicle 12 for lateral movement, such as oscillating trailer movement or trailer sway. Specifically, the vehicle 12 is pivotally attached to one embodiment of the trailer 14 that has a box frame 30 with an enclosed cargo area 32, a single axle having a right wheel assembly and a left wheel assembly, and a tongue 34 longitudinally extending forward from the enclosed cargo area 32. The illustrated trailer 14 also has a trailer hitch connector in the form of a coupler assembly 36 that is connected to a vehicle hitch connector in the form of a hitch ball 38. The coupler assembly 36 latches onto the hitch ball 38 to provide a pivoting ball joint connection 40 that allows for articulation of the hitch angle γ. It should be appreciated that additional embodiments of the trailer 14 may alternatively couple with the vehicle 12 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system for sensing the hitch angle γ in the illustrated embodiment includes a vision-based hitch angle sensor 18 that employs an imager 42 (e.g. video imaging camera) on the vehicle. The imager 42 may be located proximate an upper region of the vehicle tailgate 44 at the rear of the vehicle 12, as shown, such that the imager 42 may be elevated relative to the tongue 34 of the trailer 14. The illustrated imager 42 has an imaging field of view 46 located and oriented to capture one or more images of the trailer 14, including an imaged scene 48 (FIGS. 8-9) of the hitch connection and/or an imaged scene of one or more desired target placement zones for at least one target 50 to be secured. Although it is contemplated that the imager 42 may capture images of the trailer 14 without a target 50 to determine the hitch angle γ, in the illustrated embodiment, the trailer sway warning system 10 includes a target 50 placed on the tongue of the trailer 14 to allow the trailer sway warning system 10 to utilize information acquired via image acquisition for processing a hitch angle monitoring routine to determine the hitch angle γ. For instance, the illustrated imager 42 may include a video imaging camera that repeatedly captures successive images of the trailer 14 that may be processed to identify the target 50 and its location relative to the vehicle 12 for determining movement of the trailer 14 and the corresponding hitch angle γ, as described in more detail herein. It should also be appreciated that the imager 42 may include one or more video imaging cameras and may be located at other locations on the vehicle 12 to acquire images of the trailer 14 and the desired target placement zone, such as on a passenger cab 52 of the vehicle 12 to capture images of a gooseneck trailer. Furthermore, it is contemplated that additional embodiments of the hitch angle sensor 18 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 40, a yaw rate sensor on the trailer 14 and the vehicle 12, energy transducers of a reverse aid system, a blind spot system, and/or a cross traffic alert system, and other conceivable sensors or indicators of the hitch angle γ to supplement or be used in place of the vision-based hitch angle sensor 18.

Figure 2:
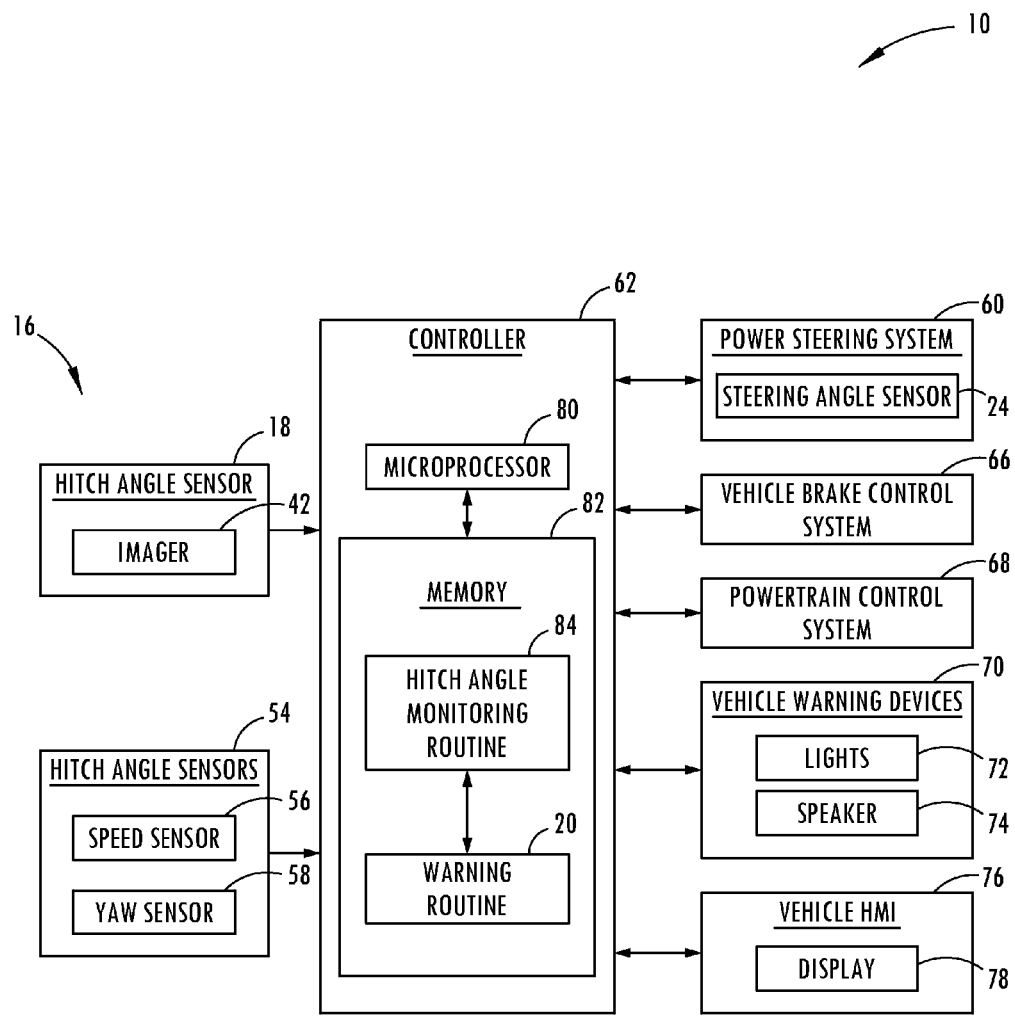
FIG. 2 is a block diagram illustrating one embodiment of a trailer sway warning system having the hitch angle sensor, a controller, and a vehicle warning devices, among other components.

With reference to the embodiment of the trailer sway warning system 10 shown in FIG. 2, the hitch angle sensor 18 provides the sensed hitch angle γ to the trailer sway warning system 10. As mentioned, one embodiment of the hitch angle sensor 18 may include an imager 42 for capturing images of the trailer 14 in ascertaining the hitch angle γ. Similarly, the illustrated embodiment of the trailer sway warning system 10 receives vehicle status-related information from additional vehicle sensors 54. This information may include a speed of the vehicle 12 from a speed sensor 56 and a yaw rate of the vehicle 12 from a yaw sensor 58. It is contemplated that in additional embodiments that the vehicle status-related information may also include positioning information from a positioning device, such as a global positioning system (GPS), to determine a coordinate location of the vehicle 12 and/or the trailer 14. Further, it is conceivable that the hitch angle sensor 18 and other vehicle sensors 54 and devices may provide sensor signals or other information, such as proximity sensor signals or successive images of the trailer 14, that a controller of the trailer sway warning system 10 may process with various routines to determine a value or other indication of the hitch angle or range of hitch angles.

As further shown in FIG. 2, one embodiment of the trailer sway warning system 10 is in communication with a power steering system 60 of the vehicle 12 to operate the steered wheels 26 (FIG. 1) of the vehicle 12. In the illustrated embodiment, the power steering system 60 is an electric power-assisted steering (EPAS) system that includes a steering angle sensor 24 for sensing the steering angle, which may be defined as the angular orientation of the steered wheels 26 of the vehicle 12 away from a longitudinal orientation. The steering angle is provided to a controller 62 of the trailer sway warning system 10 for determining when to generate the warning signal. The power steering system 60 may also include an electric steering motor for autonomously turning the steered wheels 26 to a steering angle based on a steering command. The steering command may be provided by the trailer sway warning system 10 for autonomously steering the vehicle 12 to reduce effects of sensed trailer sway and the steering command may be provided manually via a rotational position (e.g., steering wheel angle) of a steering wheel 64 (FIG. 1). In the illustrated embodiment, the steering wheel 64 of the vehicle 12 is mechanically coupled with the steered wheels 26 of the vehicle 12, such that the steering wheel 64 moves in concert with steered wheels 26, preventing manual intervention with the steering wheel 64 during autonomous steering. Accordingly, a torque sensor may be provided on the power steering system 60 to senses torque on the steering wheel 64 that is not expected from autonomous control of the steered wheels 26 and therefore indicative of manual intervention.

Still referring to the embodiment illustrated in FIG. 2, a vehicle brake control system 66 may also communicate with the controller 62 to receive braking commands for reducing the speed of the vehicle and to provide the trailer sway warning system 10 with braking information, such as wheel speed. For instance, vehicle speed information can be determined from individual wheel speeds as monitored by the brake control system 66. Vehicle speed may also be determined from a powertrain control system 68, the speed sensor 56, and a positioning device, among other conceivable means. In some embodiments, individual wheel speeds can also be used to determine a yaw rate of the vehicle, which can be provided to the trailer sway warning system 10 in the alternative or in addition to the yaw sensor 58, for use in determining when to generate a warning signal indicative of trailer sway or corrective steering commands. The powertrain control system 68, as shown in the embodiment illustrated in FIG. 2, may also interact with the trailer sway warning system 10 for regulating speed and acceleration of the vehicle 12. As mentioned above, regulation of the speed of the vehicle 12 may be necessary to limit the potential for or severity of trailer sway.

With continued reference to FIG. 2, the trailer sway warning system 10 in the illustrated embodiment may communicate with one or more devices including vehicle warning devices 70 that may be used to alert the driver of the vehicle in a variety of forms. For instance, the vehicle warning devices 70 may utilize the generated warning signal to prompt visual, auditory, and tactile warnings. As such, the vehicle warning devices 70 may include lights 72, such as exterior brake lights and vehicle emergency flashers, as well as interior dash lights and mirror lights. Also, with respect to auditory warnings, the vehicle warning devices 70 may include a speaker 74 on the interior or exterior of the vehicle. With respect to a tactile or haptic warning, the vehicle warning devices 70 may include a variety of equipment, such as the steering wheel, a driver's seat, and/or other vehicle devices. Additionally, the trailer sway warning system 10 may communicate warnings and other information with a human machine interface (HMI) 76 for the vehicle 12 including a vehicle display 78, such as a center stack mounted navigation and/or entertainment display (FIG. 1). Further, the trailer sway warning system 10 may communicate via wireless communication with another embodiment of the HMI 76, such as with one or more handheld or portable devices, including one or more smartphones. The portable device may also include the display 78 for displaying one or more images and other visual warnings to a user. For instance, the portable device may display one or more images of the trailer 14 and the present hitch angle articulation on the display. In addition, the portable device may provide feedback information, such as audible and tactile warnings.

Still referring to the embodiment shown in FIG. 2, the controller 62 is configured with a microprocessor 80 to process logic and routines stored in memory 82 that receive information from the hitch angle sensor 18, the power steering system 60, the vehicle brake control system 66, the powertrain control system 68, and other vehicle sensors 54 and devices. As recited above, the controller may process the hitch angle and related information from the hitch angle sensor 18 or other input to generate a warning signal with enough time for the driver to respond to an unacceptable trailer condition, such as trailer sway. It is disclosed herein that the trailer sway warning system 10 can issue a warning signal corresponding to a notification of an actual, impending, and/or anticipated trailer sway. The controller 62 may additionally or alternatively generate vehicle braking and/or steering commands for correcting or reducing the trailer sway. The controller 62 may include the microprocessor 80 and/or other analog and/or digital circuitry for processing one or more routines. Also, the controller 62 may include the memory 82 for storing one or more routines, including a hitch angle monitoring routine 84 and the warning routine 20. It should be appreciated that the controller 62 may be a stand-alone dedicated controller or may be a shared controller integrated with other control functions, such as integrated with the sensor system 16, the power steering system 60, and other conceivable onboard or off-board vehicle control systems.

Figure 3:
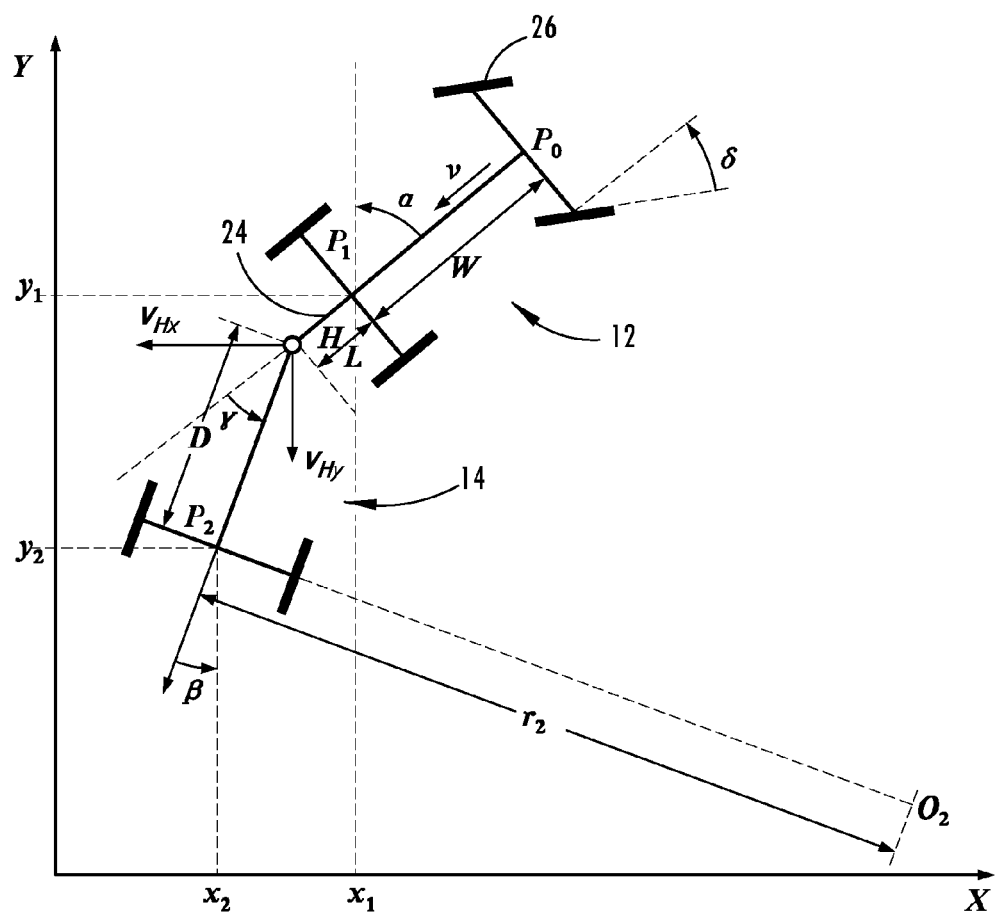
FIG. 3 is a schematic diagram that illustrates the geometry of a vehicle and a trailer overlaid with a two-dimensional x-y coordinate system, identifying variables used to determine a kinematic relationship of the vehicle and the trailer, according to one embodiment.

With reference to FIG. 3, we now turn to a discussion of vehicle and trailer information and parameters used to calculate a kinematic relationship between the trailer 14 and the steering angle of the vehicle 12 towing the trailer 14, which can be desirable for a trailer sway warning system 10 configured in accordance with some embodiments, including for use in generating corrective steering commands. To achieve such a kinematic relationship, certain assumptions may be made with regard to parameters associated with the vehicle/trailer system. Examples of such assumptions include, but are not limited to, the wheels of the vehicle 12 and the trailer 14 having negligible (e.g., no) slip, tires of the vehicle 12 having negligible (e.g., no) lateral compliance, tires of the vehicle 12 and the trailer 14 having negligible (e.g., no) deformation, actuator dynamics of the vehicle 12 being negligible, and the vehicle 12 and the trailer 14 exhibiting negligible (e.g., no) roll or pitch motions, among other conceivable factors with the potential to have an effect on controlling the trailer 14 with the vehicle 12.

As shown in FIG. 3, for a system defined by a vehicle 12 and a trailer 14, the kinematic relationship is based on various parameters associated with the vehicle 12 and the trailer 14. These parameters include:

$\delta$: steering angle at steered front wheels of the vehicle 12;
$\alpha$: yaw angle of the vehicle 12;
$\beta$: yaw angle of the trailer 14;
$\gamma$: hitch angle ($\gamma = \beta - \alpha$);
W: wheel base of the vehicle 12;
L: length between hitch point and rear axle of the vehicle 12;
D: distance between hitch point and axle of the trailer 14 or effective axle for a multiple axle trailer 14 (axle length may be an equivalent); and
$r_2$: curvature radius for the trailer 14.

One embodiment of a kinematic relationship between trailer path radius of curvature $r_2$ at the midpoint of an axle of the trailer 14, steering angle $\delta$ of the steered wheels 26 of the vehicle 12, and the hitch angle $\gamma$ can be expressed in the equation provided below. As such, if the hitch angle $\gamma$ is provided, the trailer path curvature $\kappa_2$ is can be controlled based on regulating the steering angle $\delta$ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 12 and trailer-specific parameters of the kinematic relationship can be inputted by a driver of the vehicle 12, determined from sensed trailer behavior in response to vehicle steering commands, or otherwise determined from signals provided by the trailer 14. Through the use of the equation for providing steering angle, a corresponding steering command can be generated by the curvature routine 98 for controlling the power steering system 60 of the vehicle 12.

Figure 4:
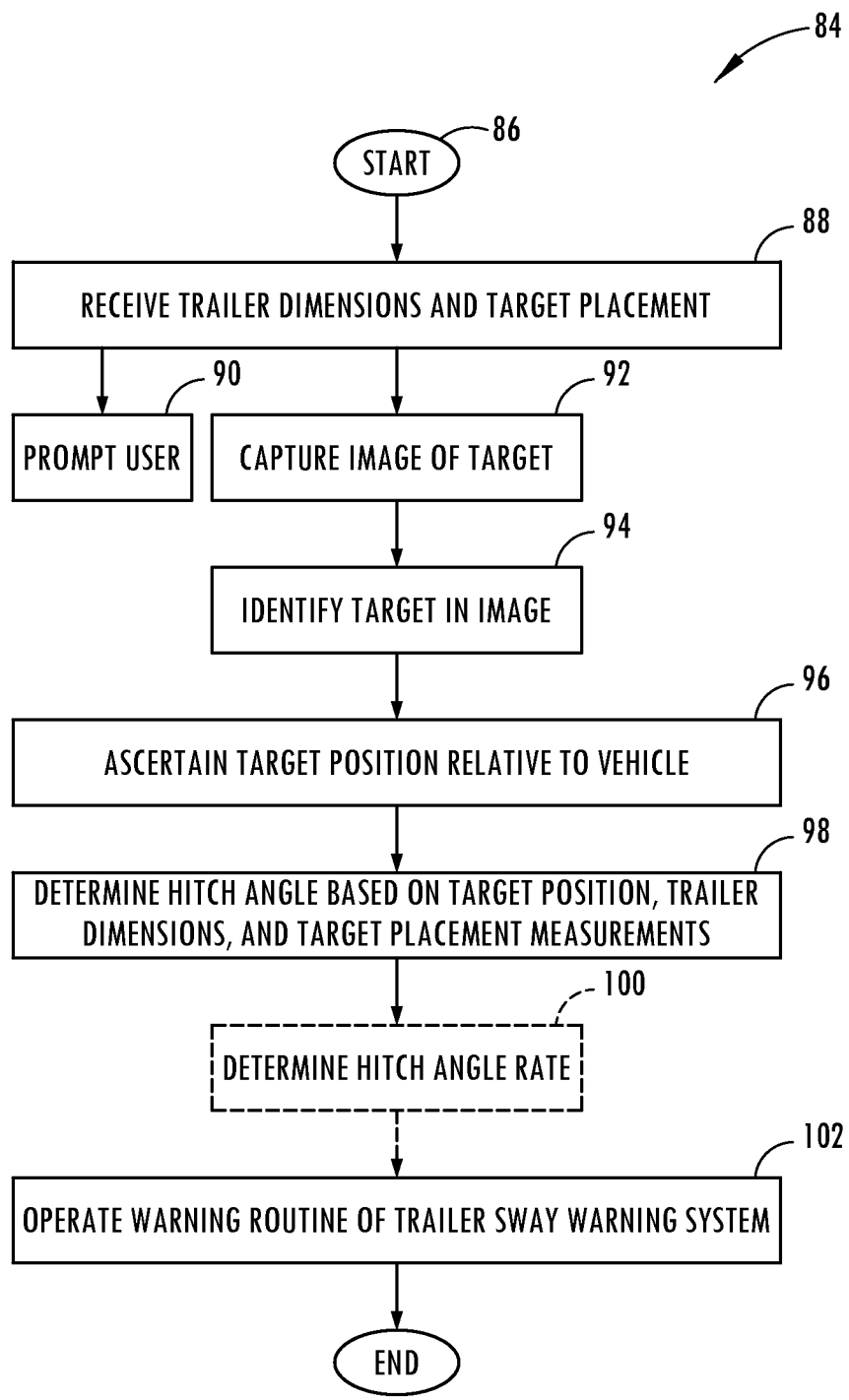
FIG. 4 is a flow diagram illustrating a method for determining a hitch angle with a hitch angle monitoring routine, according to one embodiment.

Referring now to FIG. 4, the hitch angle monitoring routine 84 is illustrated according to one embodiment. In this embodiment, at step 86, the hitch angle monitoring routine is initiated by the ignition switch of the vehicle 12 being on and the transmission moving out of the park position, although various alternative vehicle conditions may initiate the routine. Upon initiating the hitch angle monitoring routine 84, at step 88, dimensions of the trailer 14 and the location of the target 50 on the trailer 14 is provided to the controller 62. It is contemplated that the dimensions of the trailer 14 may be autonomously determined with sensor readings or may not be necessary in some embodiments of the trailer sway warning system 10. Similarly, the target location may be automatically determined with image processing. However, in the illustrated embodiment, the location of the target 50 on the trailer 14 is provided with measurements that are input into the system, such as via the HMI. Accordingly, at step 90, the user may be prompted to provide the trailer dimensions and/or the target placement measurements.

As shown in FIG. 4, once the target is placed and the hitch angle sensor 18 is operable, at step 92, an image of the target may be captured with the imager of the hitch angle sensor 18 at step 94. It is contemplated that the captured image may be a continuously streaming video image or a still image. Once the target is identified, at step 96 the imager may ascertain the position of the target 50 relative to the vehicle to then, at step 98, determine the hitch angle based on the target position, trailer dimensions, and any relevant target placement measurements. The movement of the determined hitch angle may also be calculated and output as a hitch angle rate at step 100 alone or in combination with the present hitch angle. This output may then used at step 102 to operate the warning routine 20 of the trailer sway warning system 10, as shown in the controller 62 depicted in FIG. 2 and in the flow chart depicted in FIG. 5, according to one embodiment.

Figure 5:
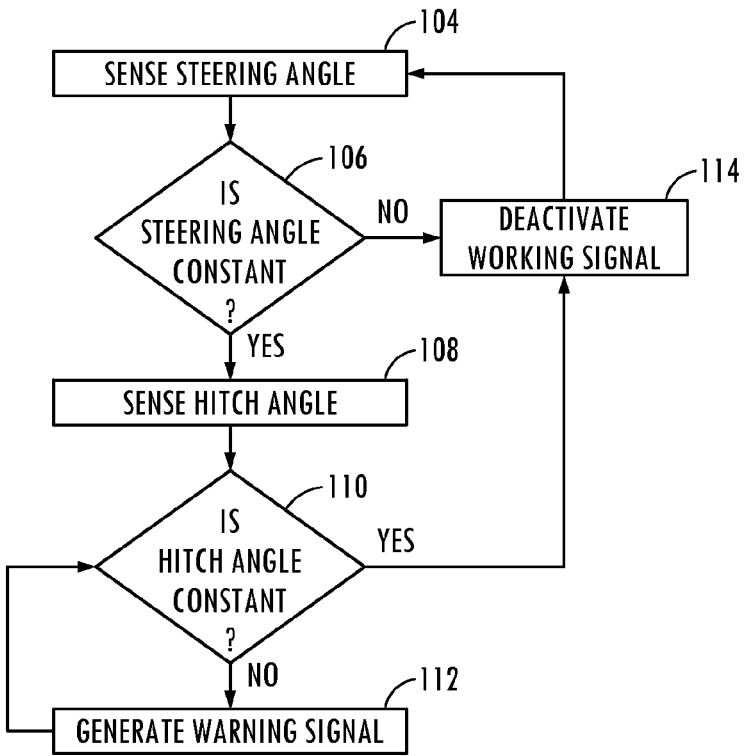
FIG. 5 is a flow diagram illustrating one embodiment of a warning routine for providing a trailer sway warning.

With reference to FIG. 5, one embodiment of the warning routine 20 is shown at step 104 by first sensing the steering angle of the vehicle, such as with the steering angle sensor 24. If the steering angle is determined at step 106 to be constant or substantially constant, the routine moves on to sense the hitch angle at step 108. However, if the steering angle is not constant or substantially constant, at step 114 any trailer sway warning signal being generated is deactivated and the routine resumes monitoring the steering angle at steps 104 and 106. Once the hitch angle is sensed at step 108, such as via the hitch angle monitoring routine 84, the hitch angle is monitored at step 110 to determine if it is constant or substantially constant. If the hitch angle is not constant or not substantially constant, a warning signal may be generated at step 112. It is also conceivable that the steering angle and the hitch angle may be monitored in reverse or in parallel to similarly determine when to generate a warning signal.

Figure 6:
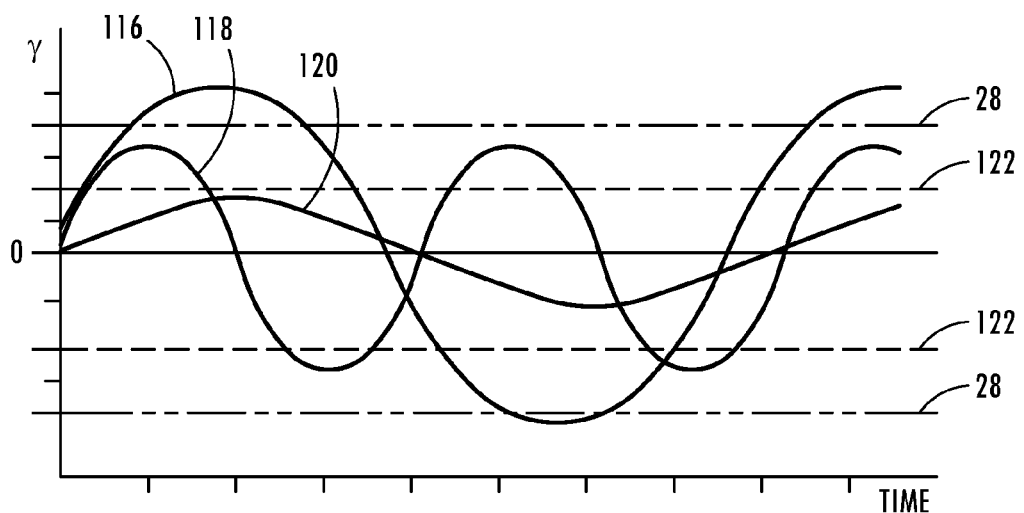
FIG. 6 is a graphical diagram illustrating different hitch angle outputs over time, a warning threshold, and a second threshold, according to one embodiment.

As illustrated in FIG. 6, three different embodiments of an oscillating hitch angle signal 116, 118, 120 are shown overlaid on a graph with a warning threshold shown at lines 28 and a second threshold shown at lines 122 for determining when the oscillation is reduced enough to deactivate a warning signal. As described in greater detail herein, this embodiment of the warning threshold and second threshold is shown to simply consider generating the warning signal based on the magnitude of the hitch angle signal oscillation (i.e. peaks and valleys), although other embodiments may consider the frequency of the hitch angle signal in combination with or alternative to the magnitude. And further, additional embodiments may also tune the warning signal to generate based on the severity of exceeding the warning threshold, such as when the magnitude of the signal exceeds the warning threshold a select number of times or for a select duration.

Figure 7:
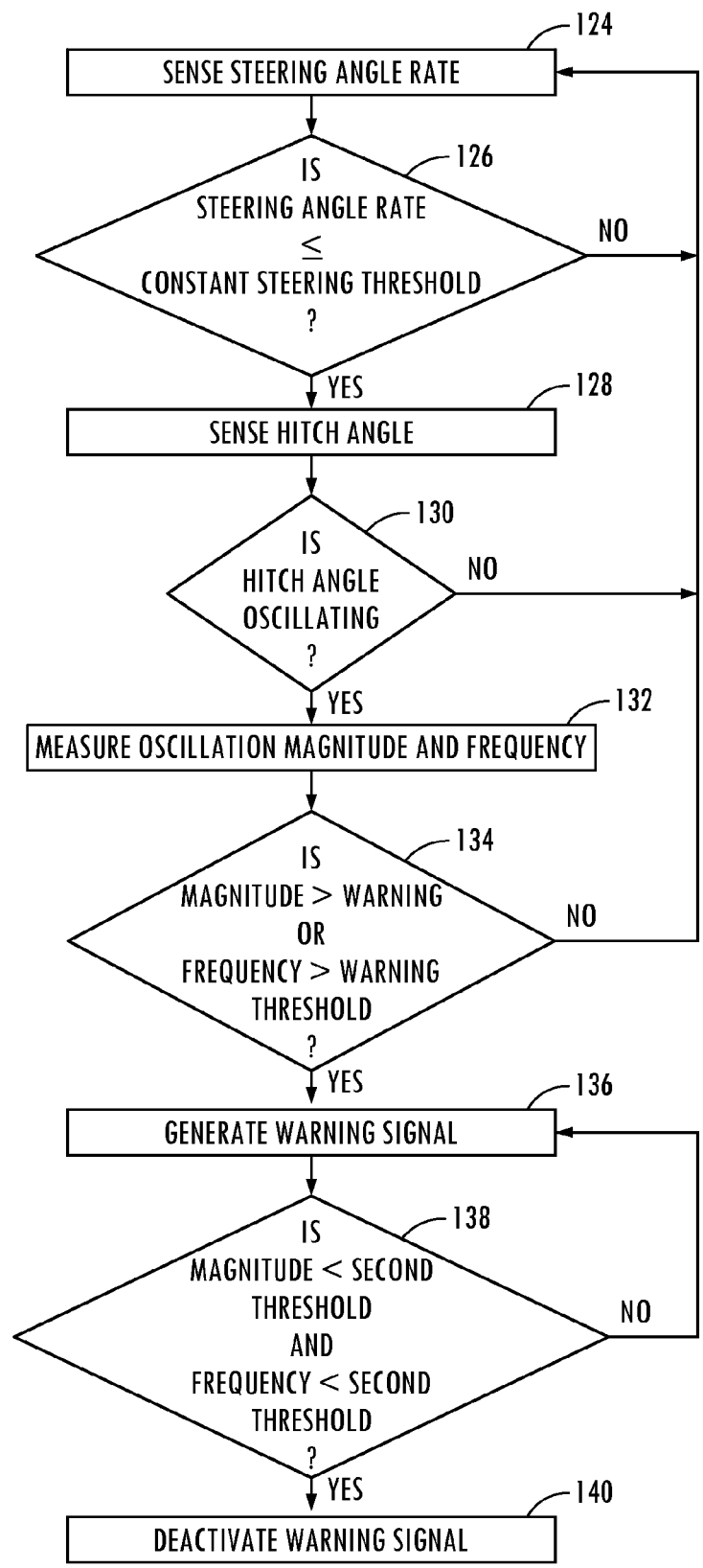
FIG. 7 is a flow diagram illustrating an additional embodiment of a warning routine for providing a trailer sway warning.

Referring now to FIG. 7, an additional embodiment of the warning routine 20 is shown that similarly generates the warning signal based on the sensed hitch angle and the sensed steering angle, although the steering angle rate is referenced at steps 124 and 126 to determine whether the steering angle rate is less than or equal to a constant steering rate threshold, which may be greater than zero. After it is determined that the steering angle rate is substantially constant, at steps 128 and 130 the hitch angle is referenced to determine whether it is considered to be in oscillation. It is contemplated that the oscillation denervation may consider the frequency of the hitch angle, the magnitude of the hitch angle, and whether the hitch angle signal is increasing and decreasing about a predicted hitch angle based on the steering angle of the vehicle and the vehicle and trailer kinematics. For instance, if the steering angle is substantially zero, it would be predicted that the corresponding hitch angle would be substantially zero, and therefore oscillation of the hitch angle above and below zero for a select threshold of time or select frequency could result in a determination that the hitch angle is oscillating.

If the determination is made that the hitch angle is oscillating, at step 132 the magnitude (or amplitude) and frequency of the oscillation is measured, if not already measured in determining the presence of oscillation. At step 134 the magnitude and the frequency of the oscillation are compared with a warning threshold to determine if the oscillation is great enough to warrant a warning signal to the driver. More specifically, the warning threshold for the magnitude (or amplitude) for the oscillation may be represented as line 28 in FIG. 6 or by the hitch angle signal exceeds the warning threshold for two periods over one cycle (a sine wave or wavelength) of oscillation. Similarly the warning threshold may have a frequency component, whereby the measured frequency of the oscillation may be compared with the frequency component of the warning threshold to determine if the frequency is great enough to warrant generating a warning signal. It is conceivable that step 134 may require the magnitude and the frequency to be greater than the warning threshold or may focus exclusively on either one of the magnitude or the frequency. Once the determination is made that the magnitude or the frequency are greater than the warning threshold, at step 136 the warning signal is generated to notify the driver that trailer sway is present.

With continued reference to the embodiment of the trailer sway warning routine 20 shown in FIG. 7, a hysteresis is provided to the warning signal when it is generated to prevent flickering of the warning signal when the sensed hitch angle is oscillating at a magnitude or frequency approximately equal to the warning threshold. At step 138, the hysteresis is applied by waiting to deactivate the warning signal at step 140 until the measured magnitude and the measured frequency are less than a second threshold that is less than the warning threshold. For instance, one embodiment of the second threshold 122 with respect to magnitude of the oscillation is show in FIG. 6, which illustrates that the second warning team is greater than the second threshold but less than the warning threshold, such that if the warning signal is present it would remain activated until the magnitude dropped below the second threshold, such as the third hitch angle signal 120. Accordingly, when the measured oscillation of the sensed hitch angle has a magnitude and a frequency less than the second threshold, at step 140, the warning signal is deactivated.

When the warning signal is generated, several things may be done separately or in combination to alert the driver and to correct the trailer sway condition. Specifically, any or a combination of the vehicle warning devices 70 may provide a visual, audible, and/or tactile warning to the driver as a manifestation of the warning signal. For instance, the warning signal may advise the driver to produce the speed of the vehicle using any of the warning devices 70 or vehicle HMI 76. Further, the warning signal may advise the driver to follow instructions followed by the vehicle HMI 76 or other vehicle warning devices 70 to correct the trailer sway when the vehicle is stopped, such as by redistributing the weight of the load within the trailer. Also, it is contemplated that the warning signal may advise the driver to check the tire condition of the vehicle and the trailer and/or advise the driver at what speed should not be exceeded to avoid trailer sway based on the kinematic relationship, previously sensed hitch angle oscillation, sensed trailer loading on the vehicle hitch ball, weather conditions, or other factors that may contribute to trailer sway conditions.

Figure 8:
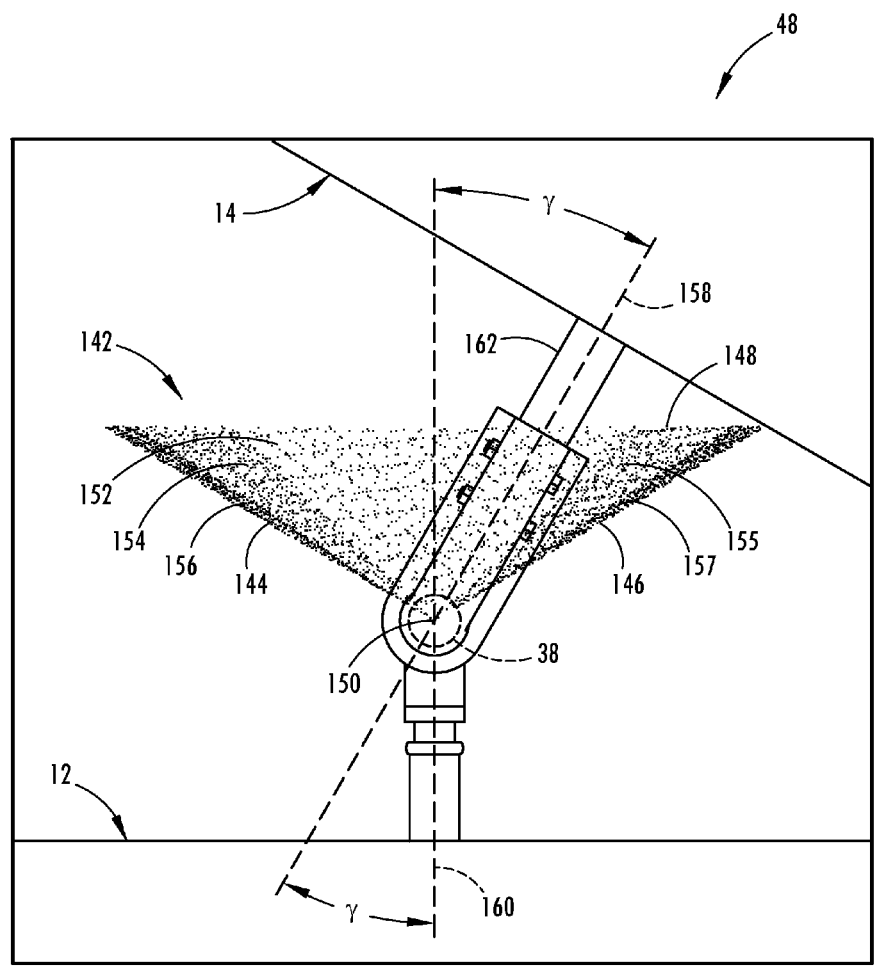
FIG. 8 is a diagram of an imaged scene showing a hitch connection at a first angle between a vehicle and a trailer for providing the warning signal and monitoring trailer sway.
Figure 9:
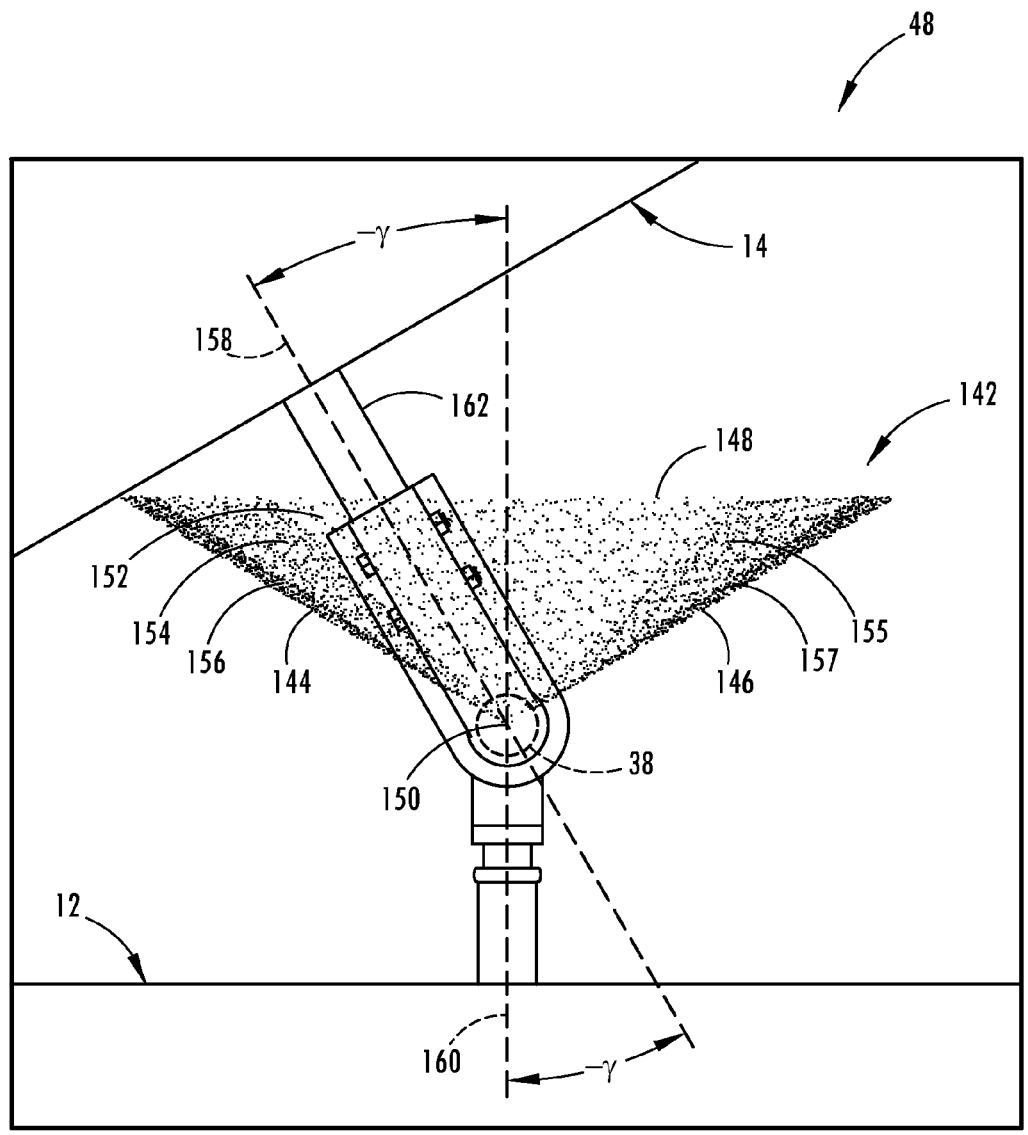
FIG. 9 a diagram of the imaged scene, as illustrated in FIG. 8, showing the hitch connection at a second angle.

To provide a visual indication of the hitch angle $\gamma$, FIG. 8 shows one embodiment of an imaged scene 48 (FIGS. 8-9) of a trailer hitch connection between the vehicle 12 and the trailer 14. This imaged scene 48 (FIGS. 8-9) may be generated as a result of the controller 62 processing one embodiment of the warning routine 20 (FIG. 2). More specifically, an overlay 142 may be super imposed on the imaged scene 48 (FIGS. 8-9) and configured as an inverted triangle defined by a first boundary line 144, a second boundary line 146, and a third boundary line 148. As shown, the first and second boundary lines 144, 146 meet at a point 150 coinciding with the trailer hitch connection 40 and extending upward and outwardly therefrom in opposite directions before being joined to an end of the third boundary line 148, which extends horizontally across the imaged scene 48 (FIGS. 8-9). With respect to the illustrated embodiment, the overlay 142 may be separated into a plurality of triangular regions that may include a central region 152, outer regions 154 and 155, and outermost regions 156 and 157. The position and dimensions of the overlay 142 may be determined by the controller 62 based on vehicle related information, camera related information, and/or trailer related information. While the overlay 142 and the accompanied regions 152-157 have been shown and described herein as being triangular, it should be appreciated that other shapes may be used for accomplishing the same.

According to one embodiment, each region 152-157 of the overlay 142 may encompass one or more hitch angle positions, each corresponding to an angular position of a centerline longitudinal axis 158 of the trailer 14 relative to a fixed centerline longitudinal axis 160 of the vehicle 12. Generally, the centerline longitudinal axis 160 of the vehicle 12 coincides with the centerline longitudinal axis 158 of the trailer 14 when the vehicle 12 is aligned with the trailer 14. For instance, the imaged scene 48 (FIGS. 8-9) shown in FIG. 8 may be captured while the vehicle 12 and trailer 14 are being driven forward and turning left along a curved path in a counterclockwise direction (i.e. the vehicle 12 is steered to the left), which is manifested in the imaged scene 48 (FIGS. 8-9) as a corresponding angular displacement of the centerline longitudinal axis 158 of the trailer 14 about point 15. Conversely, the vehicle 12 and trailer 14 may be driven forward and turned right along a curved path in a clockwise direction (i.e. the vehicle 12 is steered to the right), which is manifested as a corresponding angular displacement of the centerline longitudinal axis 158 of the trailer 14 about point 150, as exemplarily shown in FIG. 9. In either case, a hitch angle $\gamma$ describes the angular displacement of the centerline longitudinal axis 158 of the trailer 14 relative to the centerline longitudinal axis 158 of the vehicle 12.

With respect to the illustrated embodiment, the central region 152 is symmetric about the centerline longitudinal axis 160 of the vehicle 12 and encompasses hitch angle positions having relatively small hitch angles $\gamma$ in both the positive and negative directions. Outer regions 154 and 155 share mirror symmetry about the centerline longitudinal axis 160 of the vehicle 12 and encompass hitch angle positions having greater hitch angles in the positive and negative directions than those of the central region 152. Lastly, outermost regions 156 and 157 also share mirror symmetry about the centerline longitudinal axis 160 of the vehicle 12 and encompass hitch angle positions having the greatest hitch angles in both the positive and negative directions.

According to one embodiment, the outermost regions 156, 157 of the overlay 142 are each indicative of a suggested hitch angle position limit. The hitch angle position limit is not limited to any particular hitch angle value or set of values. In one implementation, the hitch angle position limit may correspond to an operational limit of a vehicle system such as, but not limited to, the trailer sway warning system 10. For instance, the hitch angle position limit may encompass a maximum hitch angle $\gamma$ at which the target 50 disposed on the trailer 14 can be accurately detected by the imager 42. In another instance, the hitch angle position may encompass a maximum hitch angle $\gamma$ before a potential jackknife condition is encountered. In any event, to provide greater visual impact, the overlay 142 may be generated as a color scale and each region 152-157 of the overlay 142 may be visually distinguished via a color associated therewith. According to one embodiment, the central region 152 may be distinguished using a green color, whereas outer regions 154, 155 may be distinguished using a yellow color and outermost regions 156 and 157 may be distinguished using a red color. However, it should be appreciated that the overlay 142 may be represented using only the outermost regions 156, 157.

To enable a driver of the vehicle 12 to monitor the hitch angle between the vehicle 12 and the trailer 14, a hitch angle position indicator 162 may be generated that visually relates the current hitch angle position to the hitch angle position limit. For purposes of illustration, the hitch angle position indicator 162 is shown in FIGS. 8 and 9 as a trailer tongue but may include other visible imaged objects. When selecting the hitch angle position indicator 162, it may be advantageous to use imaged objects that both coincide with the centerline longitudinal axis 158 of the trailer 14 and move within the overlay 142 in a consistent manner therewith. Further, if using an overlay 142 generated as a color scale, the color scale should not be so bright as to prevent a driver from seeing the trailer tongue or other imaged object serving as the hitch angle position indicator 162.

With respect to the illustrated embodiments shown in FIGS. 8 and 9, the hitch angle position indicator 162 coincides with the centerline longitudinal axis 158 of the trailer 14. In this configuration, the hitch angle position indicator 162 is equidistant from each of the outermost regions 154, 156 when the centerline longitudinal axis 158 of the trailer 14 coincides with the centerline longitudinal axis of the vehicle 12 and is angularly displaced either towards outermost region 154 or outermost region 156 when the hitch angle γ increases in either a negative direction or a positive direction, respectively. Thus, by tracking the position of the hitch angle position indicator 162 within the overlay 142, a driver of the vehicle 12 can quickly ascertain the current hitch angle position in relation to the hitch angle position limit and whether the hitch angle may be oscillatory and experiencing trailer sway.

Additionally or alternatively, the hitch angle position indicator 162 may be represented as a virtual object. According to one embodiment employing a color cast, the processor 80 may vary the brightness of the overlay 142 based on the current hitch angle position or the magnitude of frequency of oscillation. For example, the current hitch angle position is shown in FIG. 8 as contained within the central region 152 of the overlay 142. In that instance, the central region 152 or portion thereof (e.g. the right half) may be made to glow brighter in color than the other regions 154-157. Alternatively, the brightness of the central region 152 or portion thereof may remain the same while the brightness of the other regions 154-157 is reduced or eliminated altogether. In either embodiment, the processor 80 can determine in which region 152-157 the current hitch angle position is located based on hitch angle measurements supplied thereto from the hitch angle sensor 18, which may indicate both the hitch angle γ and heading relative to the centerline longitudinal axis 160 of the vehicle 12. By using hitch angle measurements to determine the current hitch angle position, the overlay 142 may be superimposed elsewhere on the imaged scene 48 (FIGS. 8-9).

As previously mentioned, the warning signal generated by the warning routine 20 may be provided to the driver in various forms, such as with the vehicle warning devices 70 and/or the vehicle HMI 76. In the event that a warning signal is generated to alert the driver of the vehicle 12 in a variety of forms, the warning signal may prompt a visual warning that includes flashing the outermost regions 154, 156 of the overlay 142. Additionally or alternatively, the warning signal may be sent to a vehicle audio system to prompt an auditory warning to the driver of the vehicle 12. Additionally or alternatively still, the warning signal may prompt a haptic warning, achievable in a variety of equipment such as, but not limited to, a driver seat and/or a smartphone or other device.

Figure 10:
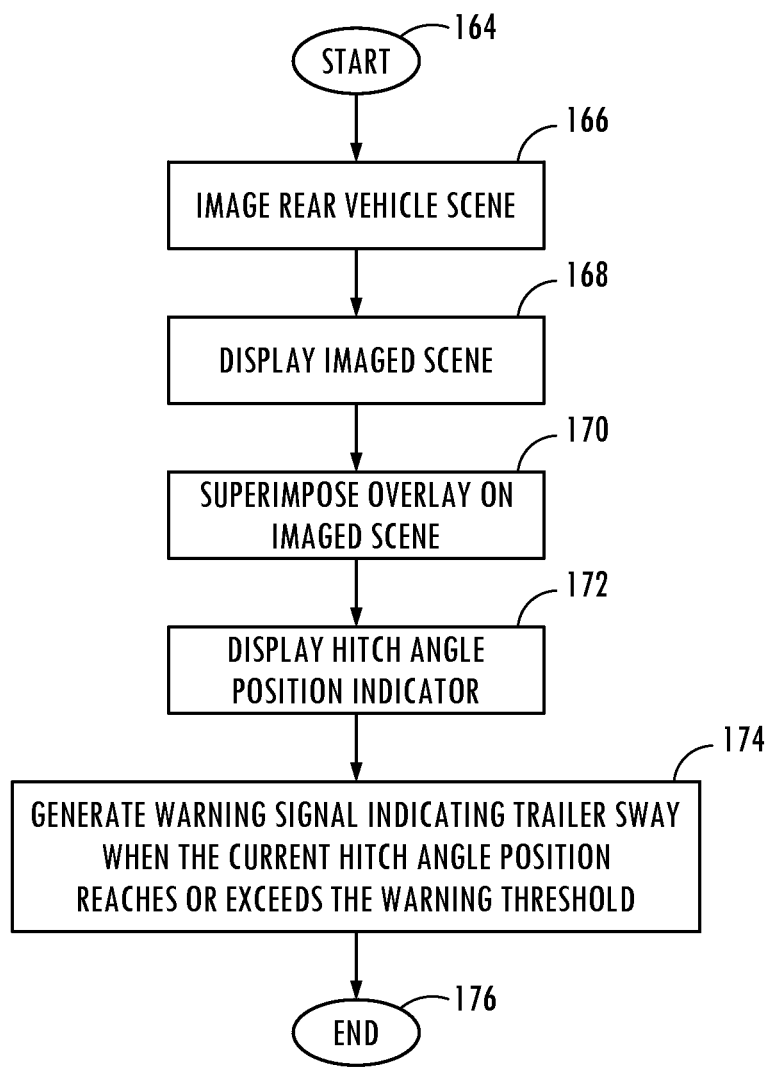
FIG. 10 is a flow chart of a hitch angle display method, according to one embodiment.

Referring to FIG. 10, a flow diagram for a method of executing the visual warning signal is shown, according to one embodiment. The method may be embodied as a routine stored in the memory 82 of the controller 62 and executed by the processor 80. The routine may start in step 164 when a vehicle 12 is placed out of park or into drive for automatic transmitters. In step 166, the imager 42 images a rear vehicle scene. In step 168, the imaged scene 48 (FIGS. 8-9) is displayed on a display 78 of the trailer sway warning system 10. In step 170, the routine superimposes an overlay 142 on the imaged scene 48 (FIGS. 8-9) that indicates a hitch angle position limit between the vehicle 12 and the trailer 14. In step 172, a hitch angle position indicator 162 is displayed on the display 78 and identifies a current hitch angle position in relation to the hitch angle limit position. In step 174, the routine generates a warning signal when the current hitch angle position reaches or exceeds the warning threshold. Once the vehicle 12 is placed in park or the ignition is turned OFF, the routine may end in step 176.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A trailer sway warning system, comprising:
    a hitch angle sensor for sensing a hitch angle between a vehicle and a trailer;
    a vehicle sensor for sensing a dynamic parameter of the vehicle; and
    a controller generating a warning signal when the dynamic parameter is constant and the hitch angle is oscillating at a magnitude that exceeds a warning threshold, wherein the warning signal is deactivated when the magnitude of oscillation of the hitch angle is reduced below a second threshold that is less than the warning threshold.

2. The trailer sway warning system of claim 1, wherein the vehicle sensor comprises a yaw rate sensor for sensing a yaw rate of the vehicle, and wherein the warning signal is generated when the yaw rate is substantially constant.

3. The trailer sway warning system of claim 2, wherein the yaw rate is substantially constant when steered wheels of the vehicle are held at a constant angle.

4. The trailer sway warning system of claim 1, wherein the vehicle sensor comprises a steering angle sensor for sensing a steering angle rate of the vehicle, and wherein the warning signal is generated when the steering angle rate is substantially zero.

5. The trailer sway warning system of claim 4, wherein the magnitude of oscillation of the hitch angle is determined by the amount the hitch angle fluctuates about a zero hitch angle that coincides with a centerline longitudinal axis of the vehicle in alignment with a tongue of the trailer.

6. The trailer sway warning system of claim 4, wherein the steering angle rate is substantially zero when steered wheels of the vehicle are held at a substantially constant angle.

7. The trailer sway warning system of claim 1, wherein the controller generates a braking command for the vehicle to reduce the magnitude of oscillation of the hitch angle when the warning signal is generated for a select duration of time.

8. The trailer sway warning system of claim 1, wherein the hitch angle sensor comprises a vision-based sensor on the vehicle that monitors a position of the trailer relative to the vehicle for determining the hitch angle.

9. The trailer sway warning system of claim 1, further comprising:
    a display for showing a visible warning when the warning signal is generated.

10. A trailer sway warning system, comprising:
    a hitch angle sensor sensing a hitch angle between a vehicle and a trailer; and
    a controller comprising:
        an oscillation module that determines a magnitude of oscillation of the hitch angle about a central angle; and
        a warning module that generates a warning signal when the magnitude of oscillation exceeds a warning threshold and the central angle is constant; wherein the warning signal is deactivated when the magnitude of oscillation of the hitch angle is reduced below a second threshold that is less than the warning threshold.

11. The trailer sway warning system of claim 10, further comprising:
    a steering angle sensor for sensing a steering angle rate of the vehicle, wherein the warning module generates the warning signal when the steering angle rate is substantially zero.

12. The trailer sway warning system of claim 10, wherein the magnitude of oscillation of the hitch angle is determined by the amount the hitch angle fluctuates about a zero hitch angle that coincides with a centerline longitudinal axis of the vehicle in alignment with a tongue of the trailer.

13. The trailer sway warning system of claim 10, wherein the controller generates a braking command for the vehicle to reduce the magnitude of oscillation of the hitch angle when the magnitude exceeds a heightened warning threshold.

14. The trailer sway warning system of claim 10, wherein the hitch angle sensor comprises a vision-based sensor on the vehicle that monitors a position of the trailer relative to the vehicle for determining the hitch angle.

15. The trailer sway warning system of claim 14, wherein the vision-based sensor includes an imager that monitors movement of a target fixed to the trailer for determining the hitch angle.

16. A method for providing a trailer sway warning, comprising:
    sensing a hitch angle between a vehicle and a trailer;
    sensing a dynamic parameter of the vehicle;
    generating a warning signal based on the dynamic parameter being constant and the hitch angle oscillating at a magnitude that exceeds a warning threshold; and
    deactivating the warning signal when the magnitude of oscillation of the hitch angle is reduced below a second threshold that is less than the warning threshold.

17. The method of claim 16, wherein the dynamic parameter comprises a yaw rate of the vehicle, and wherein the warning signal is generated when the yaw rate is substantially constant.

18. The method of claim 16, wherein the dynamic parameter comprises a steering angle rate of the vehicle, and wherein the warning signal is generated when the steering angle rate is substantially zero.

* * * * *